(12) United States Patent
Yamazoe et al.

(10) Patent No.: US 9,513,772 B2
(45) Date of Patent: Dec. 6, 2016

(54) INFORMATION PROCESSING DEVICE, INFORMATION PROCESSING METHOD, AND COMPUTER-READABLE MEDIUM

(71) Applicant: FUJI XEROX CO., LTD., Minato-ku, Tokyo (JP)

(72) Inventors: Nobuyuki Yamazoe, Kanagawa (JP); Kazunori Horikiri, Kanagawa (JP); Yusuke Kano, Kanagawa (JP); Yuki Nakamori, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 403 days.

(21) Appl. No.: 14/099,127

(22) Filed: Dec. 6, 2013

(65) Prior Publication Data
US 2014/0344717 A1    Nov. 20, 2014

(30) Foreign Application Priority Data

May 14, 2013 (JP) .................................. 2013-101943

(51) Int. Cl.
*G06F 3/0482* (2013.01)
*G06F 3/14* (2006.01)

(52) U.S. Cl.
CPC ........... *G06F 3/0482* (2013.01); *G06F 3/1454* (2013.01); *G06F 2203/04803* (2013.01); *G09G 2340/0464* (2013.01)

(58) Field of Classification Search
CPC .................. G06F 3/0482; G06F 3/1454; G06F 2203/04803; H04L 65/403; G09G 2340/0464
See application file for complete search history.

(56) References Cited

U.S. PATENT DOCUMENTS

| | | | |
|---|---|---|---|
| 2003/0182168 A1 | 9/2003 | Lyons | |
| 2004/0017400 A1* | 1/2004 | Ly | G06Q 10/06 715/810 |
| 2009/0307607 A1* | 12/2009 | Schauls | G06F 3/0483 715/752 |
| 2010/0188369 A1 | 7/2010 | Aizawa | |
| 2012/0324372 A1* | 12/2012 | Kowalkiewicz | G06Q 10/101 715/753 |

(Continued)

FOREIGN PATENT DOCUMENTS

| | | |
|---|---|---|
| JP | 2004-272473 A | 9/2004 |
| JP | 2010-170474 A | 8/2010 |
| JP | 2011-090486 A | 5/2011 |

OTHER PUBLICATIONS

Communication dated Jul. 12, 2016, from the Japanese Patent Office in counterpart Japanese application No. 2013-101943.

*Primary Examiner* — Anil Bhargava
(74) *Attorney, Agent, or Firm* — Sughrue Mion, PLLC

(57) ABSTRACT

An information processing device includes a first receiving unit that at least receives first sticky information from a first device, a second receiving unit that receives, from a second device that receives an operation for conducting a process of pasting sticky information onto a board, an operation for activating a work area, the work area being an area in which to conduct work for pasting the first sticky information, and a creating unit that, in the case in which the second receiving unit receives an operation activating a work area, creates display information for displaying an image indicating that the first sticky information is pasted into the work area.

10 Claims, 16 Drawing Sheets

(56) References Cited

U.S. PATENT DOCUMENTS

| | | | | |
|---|---|---|---|---|
| 2013/0198259 A1* | 8/2013 | Krizmanich | ........... | G06Q 10/10 709/203 |
| 2014/0164852 A1* | 6/2014 | Sumiyoshi | ............. | H04N 7/155 714/57 |
| 2015/0220257 A1* | 8/2015 | Moore | ................ | G06F 3/04845 715/765 |
| 2016/0098159 A1* | 4/2016 | McCann | ............. | G06F 3/04817 715/765 |

* cited by examiner

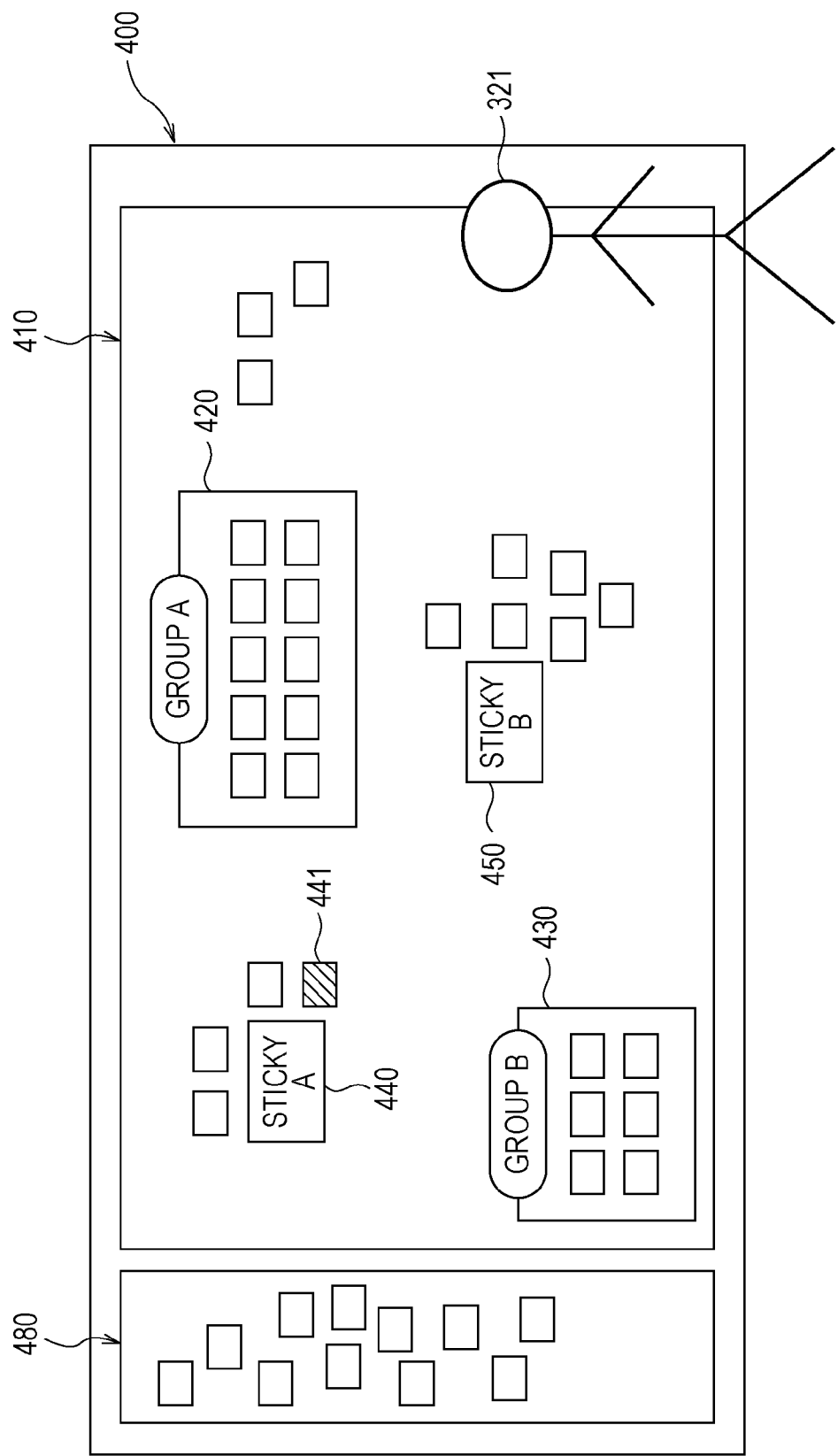

FIG. 14

| 1410 | 1420 | 1430 | 1440 | 1450 | 1460 | 1470 | 1480 | 1485 | 1490 |
|---|---|---|---|---|---|---|---|---|---|
| STICKY ID | STICKY CONTENT | CREATOR ID | CREATION TIME | CREATION DEVICE ID | TRANSMISSION TIME | SPECIFIED STICKY ID | COMMENT | COORDINATES | NUMBER OF LIKES |
| | | | | | | | | | |

| 1505 | 1510 | 1515 | 1520 | 1525 | 1530 | 1535 | 1540 | 1545 |
|---|---|---|---|---|---|---|---|---|
| BOARD ID | BOARD BACKGROUND | PARTICIPANT ID | FACILITATOR ID | CREATION TIME | END TIME | NUMBER OF GROUPS | GROUP ID | GROUP NAME |
| | | | | | | | | |

| 1550 | 1555 | 1560 | 1565 | 1570 | 1575 |
|---|---|---|---|---|---|
| GROUP POSITION | STICKY ID IN GROUP | NUMBER OF STICKIES | STICKY ID | STICKY POSITION | NUMBER OF LIKES |
| | | | | | |

1500

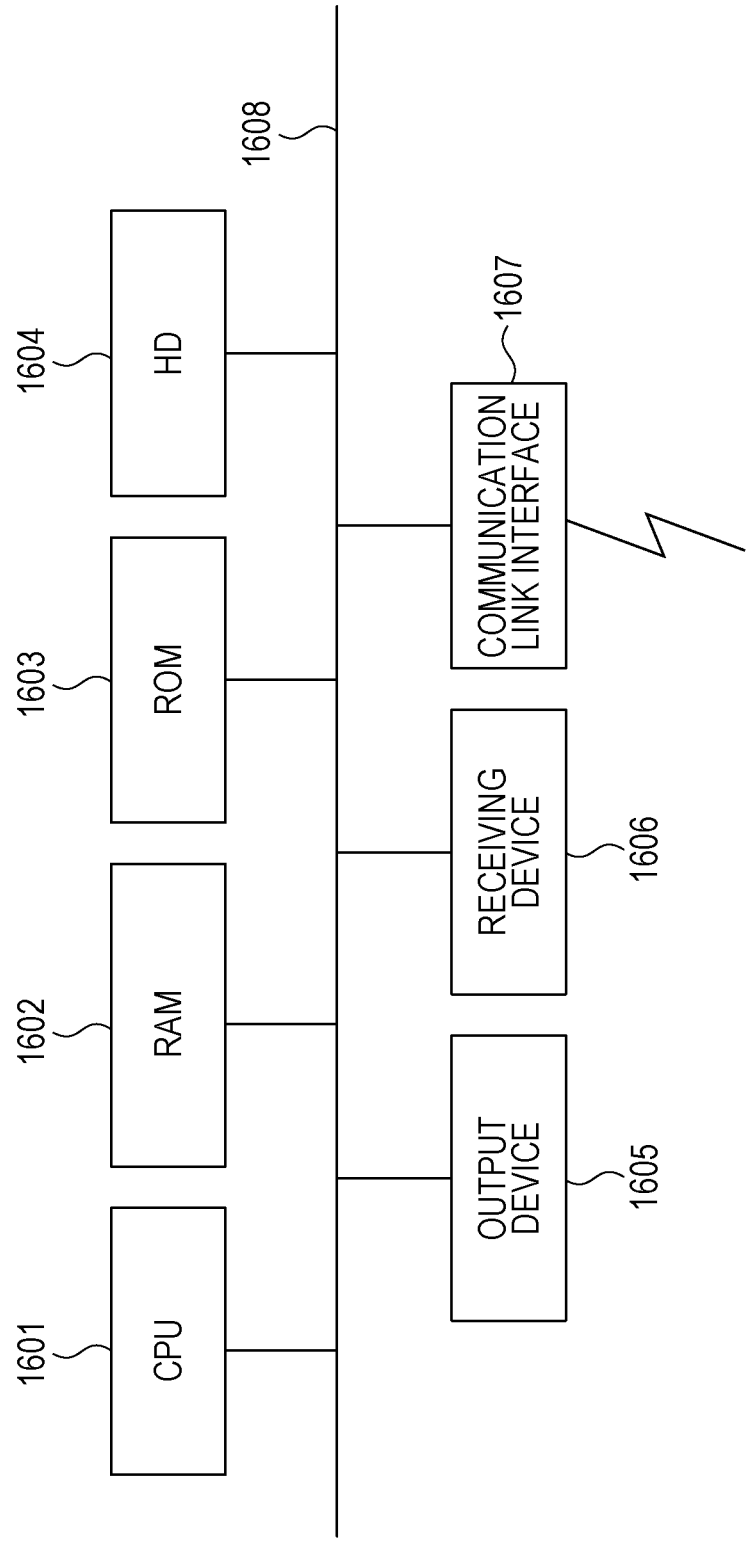

INFORMATION PROCESSING DEVICE, INFORMATION PROCESSING METHOD, AND COMPUTER-READABLE MEDIUM

CROSS-REFERENCE TO RELATED APPLICATIONS

This application is based on and claims priority under 35 USC 119 from Japanese Patent Application No. 2013-101943 filed May 14, 2013.

BACKGROUND

Technical Field

The present invention relates to an information processing device, an information processing method, and a computer-readable medium.

SUMMARY

According to an aspect of the invention, there is provided an information processing device including a first receiving unit that at least receives first sticky information from a first device, a second receiving unit that receives, from a second device that receives an operation for conducting a process of pasting sticky information onto a board, an operation for activating a work area, the work area being an area in which to conduct work for pasting the first sticky information, and a creating unit that, in the case in which the second receiving unit receives an operation activating a work area, creates display information for displaying an image indicating that the first sticky information is pasted into the work area.

BRIEF DESCRIPTION OF THE DRAWINGS

An exemplary embodiment of the present invention will be described in detail based on the following figures, wherein:

FIG. 4 is an explanatory diagram illustrating an example of a shared screen;

FIG. 14 is an explanatory diagram illustrating an exemplary data structure of a sticky information table;

FIG. 15 is an explanatory diagram illustrating an exemplary data structure of a board information table; and FIG. 16 is a block diagram illustrating an exemplary hardware configuration of a computer that realizes the exemplary embodiment.

DETAILED DESCRIPTION

Hereinafter, an exemplary embodiment related to realizing the present invention will be described by way of example on the basis of the drawings.

Figure 1:
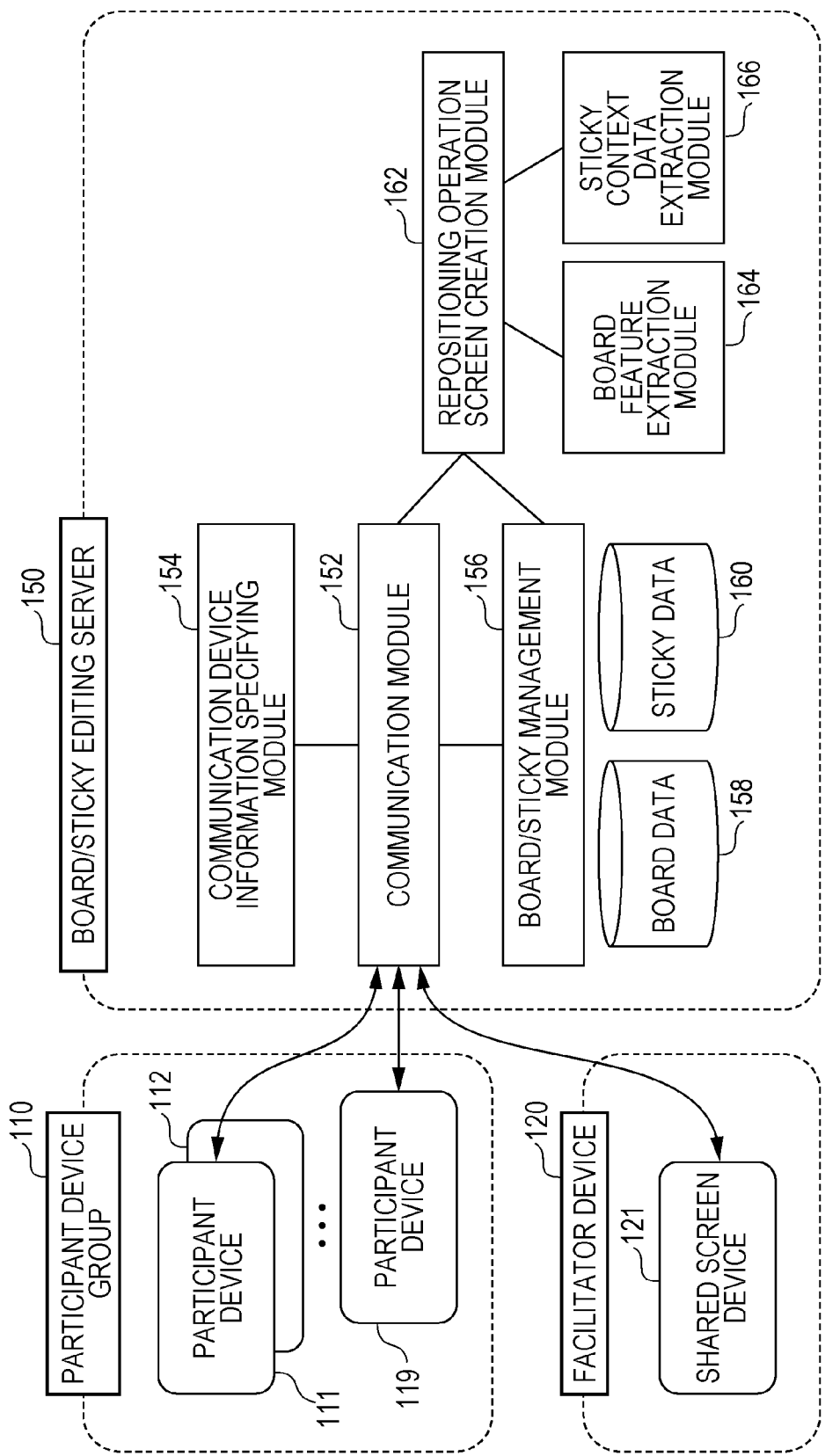
FIG. 1 is a schematic module configuration diagram for an exemplary configuration according to an exemplary embodiment.

FIG. 1 illustrates a schematic module configuration for an exemplary configuration according to the exemplary embodiment.

Note that the term module refers to components such as software (computer programs) and hardware which are typically capable of being logically separated. Consequently, the term module in the exemplary embodiment not only refers to modules in a computer program, but also to modules in a hardware configuration. Thus, the exemplary embodiment also serves as a description of a computer program (a program that causes a computer to execute respective operations, a program that causes a computer to function as respective units, or a program that causes a computer to realize respective functions), a system, and a method for inducing functionality as such modules. Note that although terms like "store" and "record" and their equivalents may be used in the description for the sake of convenience, these terms mean that a storage apparatus is made to store information or that control is applied to cause a storage apparatus to store information in the case where the exemplary embodiment is a computer program. Also, while modules may be made to correspond with function on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data and referential relationships between instructions and data) in addition to physical connections. The term "predefined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of multiple "predefined values", the predefined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted.

Also, the terms "system" and "apparatus" not only encompass configurations in which multiple computers, hardware, or apparatus are connected by a communication medium such as a network (including connections that support 1-to-1 communication), but also encompass configurations realized by a single computer, hardware, or apparatus. The terms "apparatus" and "system" are used interchangeably. Obviously, the term "system" does not include merely artificially arranged social constructs (social systems).

Also, every time a process is conducted by each module or every time multiple processes are conducted within a module, information to be processed is retrieved from a storage apparatus, and the processing results are written back to the storage apparatus after the processing. Consequently, description of the retrieval from a storage apparatus before processing and the writing back to a storage apparatus after processing may be reduced or omitted in some cases. Note that the storage apparatus herein may include hard disks, random access memory (RAM), an auxiliary or external storage medium, storage apparatus accessed via a communication link, and registers, etc. inside a central processing unit (CPU).

A board/sticky editing server 150, which is an information processing device according to the exemplary embodiment, handles sticky information (also called electronic sticky notes or electronic cards), and as illustrated by example in FIG. 1, includes a communication module 152, a communication device information specifying module 154, a board/sticky management module 156, board data 158, sticky data 160, a repositioning operation screen creation module 162, a board feature extraction module 164, and a sticky context data extraction module 166. The board/sticky editing server 150 is connected to multiple participant devices (such as a participant device 111), and a shared screen device 121. Devices such as a participant device 111, a participant device 112, and a participant device 119 are connected to the communication module 152. The shared screen device 121 is connected to the communication module 152.

The board/sticky editing server 150 is utilized during a meeting (such as a conference, brainstorming session, or review session) conducted by multiple participants and a facilitator using sticky information. A participant uses a participant device (such as the participant device 111) to create sticky information stating an idea or the like. Generally, as illustrated in FIG. 1, a participant device group 110 includes devices such as the participant device 111, the participant device 112, and the participant device 119 (hereinafter represented as the participant device 111), and there are multiple participant devices. In addition, the board/sticky editing server 150 receives sticky information from the participant device 111, and pastes that sticky information on a board. The facilitator uses a shared screen device 121, which is a facilitator device 120, and proceeds with the meeting by, for example, determining or modifying the position of sticky information, collecting sticky information together, or creating sticky information him- or herself on the board.

The communication module 152 is connected to the participant device 111, the shared screen device 121, the communication device information specifying module 154, the board/sticky management module 156, and the repositioning operation screen creation module 162. The communication module 152 receives at least first sticky information from a first device (that is, a participant device 111). For example, the communication module 152 receives sticky information stating information such as text or graphics according to operations by a participant of the participant device 111. The content may state an idea, opinion, or the like. More specifically, the content is information in a sticky information table 1400 (particularly, a sticky content field 1420) to be discussed later.

Then, from a second device (that is, the shared screen device 121) that receives an operation for conducting a process of pasting sticky information onto the board, the communication module 152 receives an operation for activating a work area, which is an area in which to conduct the work of pasting the first sticky information transmitted from the participant device 111. Specifically, the operation to be received corresponds to an operation that moves a work area specifying icon 600 into a board area 410, as in the example of FIG. 7 to be discussed later.

The communication device information specifying module 154 is connected to the communication module 152. The communication device information specifying module 154 specifies the participant device that transmitted the first sticky information, and specifies the participant using that participant device. The communication device information specifying module 154 also specifies a device (such as the shared screen device 121 or a participant device 111 that requested board-related information) to which to transmit information related to a board with pasted sticky information (such as an image indicating the board, or pasted sticky information). According to a processing result from the communication device information specifying module 154, the communication module 152 specifies the participant device or the like that transmitted the first sticky information, or transmits board-related information to a device.

The board/sticky management module 156 is connected to the communication module 152, the repositioning operation screen creation module 162, the board data 158, and the sticky data 160. The board/sticky management module 156, following a request from the communication module 152 and the repositioning operation screen creation module 162, extracts board-related information from the board data 158, or sticky information from the sticky data 160.

The sticky data 160 is connected to the board/sticky management module 156. The sticky data 160 stores sticky information. For example, the sticky data 160 stores the sticky information table 1400. FIG. 14 is an explanatory diagram illustrating an exemplary data structure of the sticky information table 1400. The sticky information table 1400 includes a sticky ID field 1410, a sticky content field 1420, a creator ID field 1430, a creation time field 1440, a creation device ID field 1450, a transmission time field 1460, a specified sticky ID field 1470, a comment field 1480, a coordinates field 1485, and a number of likes field 1490. The sticky ID field 1410 stores a sticky identification (ID) for uniquely specifying sticky information in the exemplary embodiment. The sticky content field 1420 stores text, graphics, or the like stated by a participant in the sticky information. For example, the sticky content may be a character code sequence, vector data indicating the path of a finger or pen, or the file name of a file storing such data. The creator ID field 1430 stores a participant ID for uniquely specifying the participant who created that sticky information in the exemplary embodiment. The creation time field 1440 stores the time at which that sticky information was created (the time may be the year, month, day, hour, minute, second, fraction of a second, or some combination thereof. This applies similarly hereinafter.) The creation device ID field 1450 stores a creation device ID for uniquely specifying the device on which that sticky information was created in the exemplary embodiment. The transmission time field 1460 stores the time at which that sticky information was transmitted. The specified sticky ID field 1470 stores second sticky information related to that sticky information (the first sticky information). The "second sticky information" is sticky information that is already pasted onto the board. The information may be the sticky ID of second sticky information specified by the participant who created by the first sticky information, and the sticky ID of that second sticky information is specified in the case where, for example, the content of the first sticky information was proposed by looking at the second sticky information, and the participant thinks that the content should be positioned near the second sticky information. Note that "NULL" is stored in the case in which a participant does not specify second sticky information. The comment field 1480 stores a comment related to that sticky information. The creator of the comment may be the participant who created the sticky information, another participant, or the facilitator. The coordinates field 1485 stores the position of that sticky information on the board (XY coordinates on the board, for example). The number of likes field 1490 stores a count of the number of times participants pressed a "Like" button for that sticky information (that is, the number of likes).

The board data 158 is connected to the board/sticky management module 156. The board data 158 stores board-related information. For example, the board data 158 stores a board information table 1500. FIG. 15 is an explanatory diagram illustrating an exemplary data structure of the board information table 1500. The board information table 1500 includes a board ID field 1505, a board background field 1510, a participant ID field 1515, a facilitator ID field 1520, a creation time field 1525, an end time field 1530, a number of groups field 1535, a group ID field 1540, a group name field 1545, a group position field 1550, a sticky ID in group field 1555, a number of stickies field 1560, a sticky ID field 1565, a sticky position field 1570, and a number of likes field 1575. The board ID field 1505 stores a board ID for uniquely specifying a board in the exemplary embodiment. The board background field 1510 stores a background pattern for the board (such as XY axes or a template image, for example). The participant ID field 1515 stores participant IDs of participants using that board. The facilitator ID field 1520 stores a facilitator ID of a facilitator using that board. The creation time field 1525 stores the creation start time of that board. The end time field 1530 stores the creation end time of that board. The number of groups field 1535 stores the number of groups forming sets on that board. There exist sets of the group ID field 1540, the group name field 1545, the group position field 1550, and the sticky ID in group field 1555, equal to the number of groups. The group ID field 1540 stores a group ID for uniquely specifying that group in the exemplary embodiment. The group name field 1545 stores a name for that group (such as group A and group B in FIG. 7 and other drawings). The group position field 1550 stores the position of that group on the board (XY coordinates on the board, for example). The sticky ID in group field 1555 stores sticky IDs of sticky information included as elements in that group. The number of stickies field 1560 stores the number of sets of sticky information pasted on that board. There exist sets of the sticky ID field 1565, the sticky position field 1570, and the number of likes field 1575, equal to the number of sets of sticky information. The sticky ID field 1565 stores a sticky ID of sticky information pasted onto that board. The sticky position field 1570 stores the position of that sticky information on the board (XY coordinates on the board, for example). The number of likes field 1575 stores a count of the number of times participants pressed a "Like" button for that sticky information (that is, the number of likes).

The repositioning operation screen creation module 162 is connected to the communication module 152, the board/sticky management module 156, the board feature extraction module 164, and the sticky context data extraction module 166. In the case in which the communication module 152 receives an operation activating a work area, the repositioning operation screen creation module 162 creates display information for displaying an image indicating that the first sticky information is pasted into that work area. For a specific example, see step S516 in the flowchart illustrated by example in FIGS. 5A and 5B discussed later. In addition, the repositioning operation screen creation module 162 may also create display information for displaying an image indicating, in that work area, a relationship between board feature information or first sticky information transmitted from a participant device 111 and second sticky information already pasted onto the board. For a specific example of the creation of an image indicating board feature information, see step S564 in the flowchart illustrated by example in FIGS. 5A and 5B discussed later. Also, for a specific example of the creation of an image indicating a relationship with second sticky information, see step S566 in the flowchart illustrated by example in FIGS. 5A and 5B discussed later. "The case in which the communication module 152 receives an operation activating a work area" refers to a period after such an operation is received, and lasting until an operation disabling the work area is received. In order to create display information, board features (the board information table 1500, for example) extracted by the board feature extraction module 164, and sticky context data (the sticky information table 1400, for example) extracted by the sticky context data extraction module 166 are used. "Display information for creating an image" may also be referring to the image itself. In this case, the shared screen device 121 receiving the display information simply displays the image received from the board/sticky editing server 150 directly. The display information may also be data for drawing an image (such as text data, or vector data for drawing graphics, for example).

For example, the repositioning operation screen creation module 162 may conduct the following process. This process is for the case in which second sticky information is not specified by the participant using the participant device 111 (the case of entrusting the positioning of the first sticky information to the facilitator).

(Candidate display UI/A1) The repositioning operation screen creation module 162 may create display information enabling an operator using the shared screen device 121 to select, and display in a work area, one or more from among sticky information groups that are grouped on the board, sticky information whose number of likes from participants using participant devices 111 is greater than a predetermined number, and sticky information transmitted by a participant device 111 that transmitted the first sticky information being processed. This process will be discussed in detail using the example in FIG. 9.

(Candidate display UI/A2) Also, the repositioning operation screen creation module 162 may create a reduced image of the board, and create display information enabling an operator using the shared screen device 121 to specify a placement position for the first sticky information within the reduced image, and display the first sticky information in a work area. This process will be discussed in detail using the example in FIG. 10.

Meanwhile, in the case in which the communication module 152 receives first sticky information and second sticky information related to the first sticky information from a participant device 111, the repositioning operation screen creation module 162 may conduct a process like the following. This process uses the second sticky information specified by the participant using the participant device 111.

(Candidate display UI/B1) The repositioning operation screen creation module 162 may display the second sticky information received by the communication module 152 within a work area, and create display information enabling the drawing of a graphic indicating a positional relationship with that second sticky information on the board. This process will be discussed in detail using the example in FIG. 11.

(Candidate display UI/B2) The repositioning operation screen creation module 162 may create an image of second sticky information received by the communication module 152 and the sticky information surrounding that second sticky information on the board, and create display information enabling an operator using the shared screen device 121 to specify a placement position for the first sticky information within the created image, and display the first sticky information in a work area. This process will be discussed in detail using the example in FIG. 12.

Note that the display on the shared screen device 121 or the participant device 111 is presented on the basis of what is generated by the repositioning operation screen creation module 162 or the board/sticky management module 156. Consequently, in the detailed description, the shared screen device 121 or the participant device 111 "displaying" something means that the repositioning operation screen creation module 162 or the board/sticky management module 156 creates display information, and the shared screen device 121 or the participant device 111 presents a display in accordance with that display information.

Obviously, after presenting a display according to any of the above candidate UI/A1, candidate UI/A2, candidate UI/B1, or candidate UI/B2, the repositioning operation screen creation module 162 creates display information for displaying an image indicating that the first sticky information has been pasted onto the board, according to an operation on the shared screen device 121 by an operator. For example, with the candidate UI/A1, the repositioning operation screen creation module 162 creates display information for displaying an image indicating that the first sticky information has been pasted near a sticky information group or sticky information selected by the operator. With the candidate UI/A2, the repositioning operation screen creation module 162 creates display information for displaying an image indicating that the first sticky information has been pasted at a placement position specified by the operator. With the candidate UI/B1, the repositioning operation screen creation module 162 creates display information for displaying an image indicating that the first sticky information has been pasted at a placement position specified by the creator who created the first sticky information, in response to an OK operation by the operator. With the candidate UI/B2, the repositioning operation screen creation module 162 creates display information for displaying an image indicating that the first sticky information has been pasted at a placement position specified by the operator.

Also, the repositioning operation screen creation module 162 may create display information for displaying an image indicating that the first sticky information has been pasted in a predetermined area on the board in the case where the communication module 152 has not received an operation activating a work area, and the first sticky information is not related to second sticky information already pasted onto the board. For a specific example, see step S514 in the flowchart illustrated by example in FIGS. 5A and 5B discussed later, and the free area 480 illustrated by example in FIG. 4. Note that "the first sticky information is not related to second sticky information already pasted onto the board" refers to the case in which the creator who created the first sticky information has not specified a position at which to paste that first sticky information.

Also, the repositioning operation screen creation module 162 may create display information for displaying an image indicating that the first sticky information has been pasted near second sticky information in the case where the communication module 152 has not received an operation activating a work area, and the first sticky information is related to second sticky information already pasted onto the board. For a specific example, see step S518 in the flowchart illustrated by example in FIGS. 5A and 5B discussed later, and the position of the new sticky 441 illustrated by example in FIG. 4. Note that "the first sticky information is related to second sticky information already pasted onto the board" refers to the case in which the creator who created the first sticky information has specified second sticky information as a position at which to paste that first sticky information.

The board feature extraction module 164 is connected to the repositioning operation screen creation module 162. The board feature extraction module 164 extracts features of the board being used from the board data 158 via the board/sticky management module 156.

The sticky context data extraction module 166 is connected to the repositioning operation screen creation module 162. The sticky context data extraction module 166 extracts context data about sticky information being processed from the sticky data 160 via the board/sticky management module 156.

In addition, the communication module 152 transmits display information created by the repositioning operation screen creation module 162 to the shared screen device 121. The shared screen device 121 receives the display information, and positions the first sticky information on the board according to an operation on a work area by the facilitator.

Figure 2:
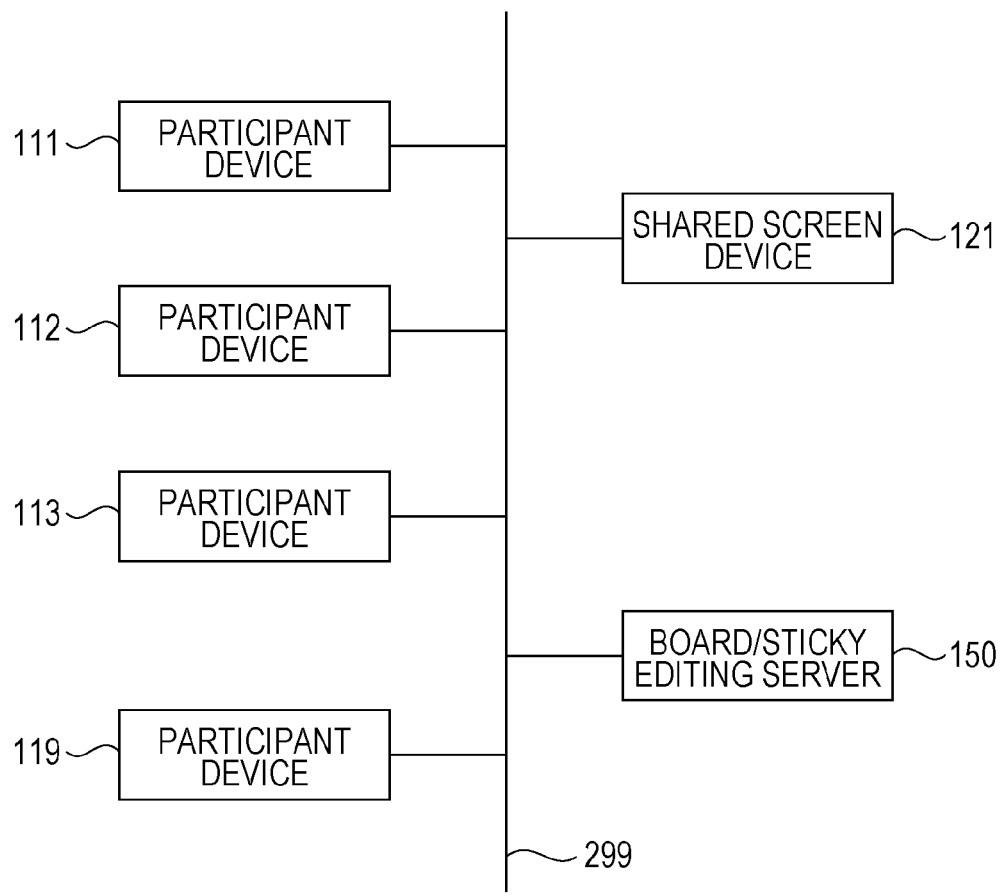
FIG. 2 is an explanatory diagram illustrating an exemplary system configuration in the case of realizing the exemplary embodiment.

FIG. 2 is an explanatory diagram illustrating an exemplary system configuration in the case of realizing the exemplary embodiment. A participant device 111, a participant device 112, a participant device 113, a participant device 119, a shared screen device 121, and a board/sticky editing server 150 are respectively connected via a communication link 299. Although not all devices may be in the same room (such as a conference room), generally the participant device 111 and the like used by participants and the shared screen device 121 used by the facilitator are in the same room. The communication link 299 may be a wired link or a wireless link. Also, the board/sticky editing server 150 may be incorporated into the shared screen device 121.

Figure 3A:
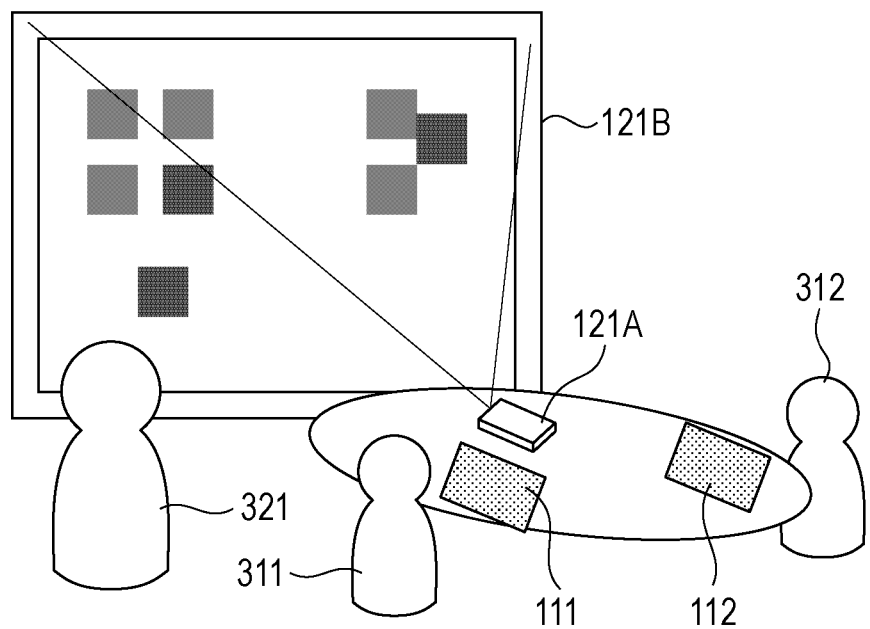
FIGS. 3A and 3B are explanatory diagrams illustrating an example of a conference room or the like used by the exemplary embodiment.
Figure 3B:
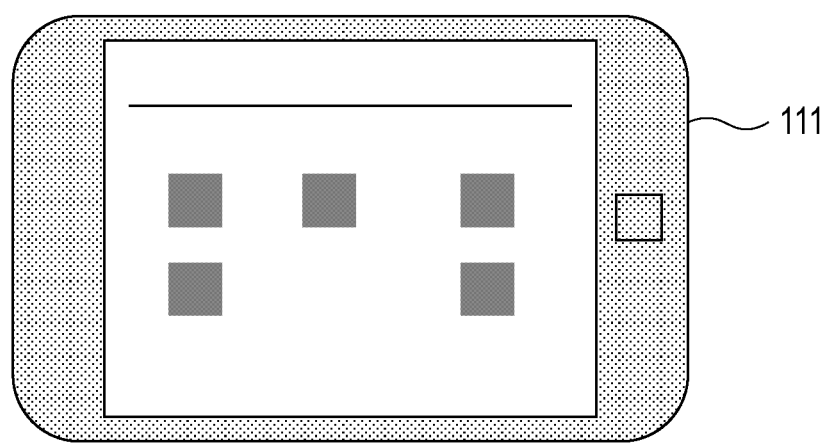

FIGS. 3A and 3B are explanatory diagrams illustrating an example of a conference room or the like used by the exemplary embodiment.

As illustrated in the example in FIG. 3A, participants 311 and 312 and a facilitator 321 are gathered in a conference room or the like. The participant 311 uses the participant device 111, while the participant 312 uses the participant device 112. Generally, each participant is given one participant device (such as the participant device 111) which, like the participant device 111 illustrated in the example of FIG. 3B, is a tablet device approximately the size of a notebook (such as A4, B5, or from 7 to 10 inches, for example), and is operated using a finger, pen, or the like. Sticky information stating handwritten text, graphics, or the like is created by a participant. Note that a participant device is not limited to a tablet device, and may also be a device such as a PC equipped with a keyboard, mouse, and the like.

The shared screen device 121A is a projector, and displays a board. The shared screen device 121A may also be a device equipped with a large screen (a size such as 80 inches, for example). In addition, the shared screen device 121B is a whiteboard that senses the motion of a finger, pen, or the like of a facilitator 321, and receives operations such as the pasting of sticky information onto the board. For example, the shared screen device 121B may be equipped with a pen, and receives an operation with respect to the board and sticky information by sensing that the pen has left a predetermined pen holder (that is, the facilitator 321 has picked up the pen in order to perform an operation), and by sensing the position of the pen tip (such as the pen tip touching the shared screen device 121B). For example, a sensor may be provided in the pen holder (such as a sensor in which a switch turns on/off by the weight of a pen), and may sense which pen from among multiple pens is being used. Also, the entire display screen of the shared screen device 121B may be a touch sensor, and may sense touched positions on the display screen.

FIG. 4 is an explanatory diagram illustrating an example of a shared screen 400. The shared screen 400 is displayed on the shared screen device 121B illustrated in the example of FIG. 3A.

The shared screen 400 includes a board area 410 and a free area 480. Inside the board area 410, besides general sticky information (the small rectangles in FIG. 4), there are displayed a group area 420, a group area 430, an enlarged sticky A 440, and an enlarged sticky B 450. Inside the free area 480, there is displayed sticky information transmitted from participant devices (sticky information whose position has not been specified). Sticky information inside the free area 480 is then moved into the board area 410 according to an operation by the facilitator 321. Also, sticky information whose position has been specified by the participant of a participant device is directly positioned inside the board area 410. For example, sticky information that is related to the enlarged sticky A 440 is positioned at the position of the new sticky 441.

Also, multiple sets of sticky information may be grouped (like the group area 420 and the group area 430, for example) by an operation of the facilitator 321. For example, such sticky information may be positioned in one place, and upon sensing an enclosing line being drawn, the enclosed sticky information is grouped.

Unlike physical, paper stickies, sticky information is electronically pasted on the board, and the screen of the board (the physical size of the screen) is large, thus making it difficult to understand that sticky information from a participant device 111 has been pasted, and the location thereof. This tendency is particularly strong in cases such as the case in which many sets of sticky information are pasted onto the board, or in the case in which multiple sets of sticky information are transmitted from participant devices in a short period of time. Also, since the screen of the board is large, the burden of positioning work by the facilitator (work such as selecting sticky information and moving sticky information to a desired position, for example) increases.

Also, participants are able to "Like" sticky information pasted onto the board. For example, in the case in which a participant approves of the content stated in sticky information, the participant specifies that sticky information and presses a "Like" button displayed on the participant device 111 (or presses a "Like" button attached to each set of sticky information). The number of presses is then counted and stored in the number of likes field 1490 of the sticky information table 1400, and in the number of likes field 1575 of the board information table 1500. Sticky information for which the number of presses is greater than a predetermined number is displayed larger than other sticky information (like the enlarged sticky A 440 and the enlarged sticky B 450, for example).

The board/sticky editing server 150 of the present exemplary embodiment is introduced into such a conference support system.

Figure 5A:
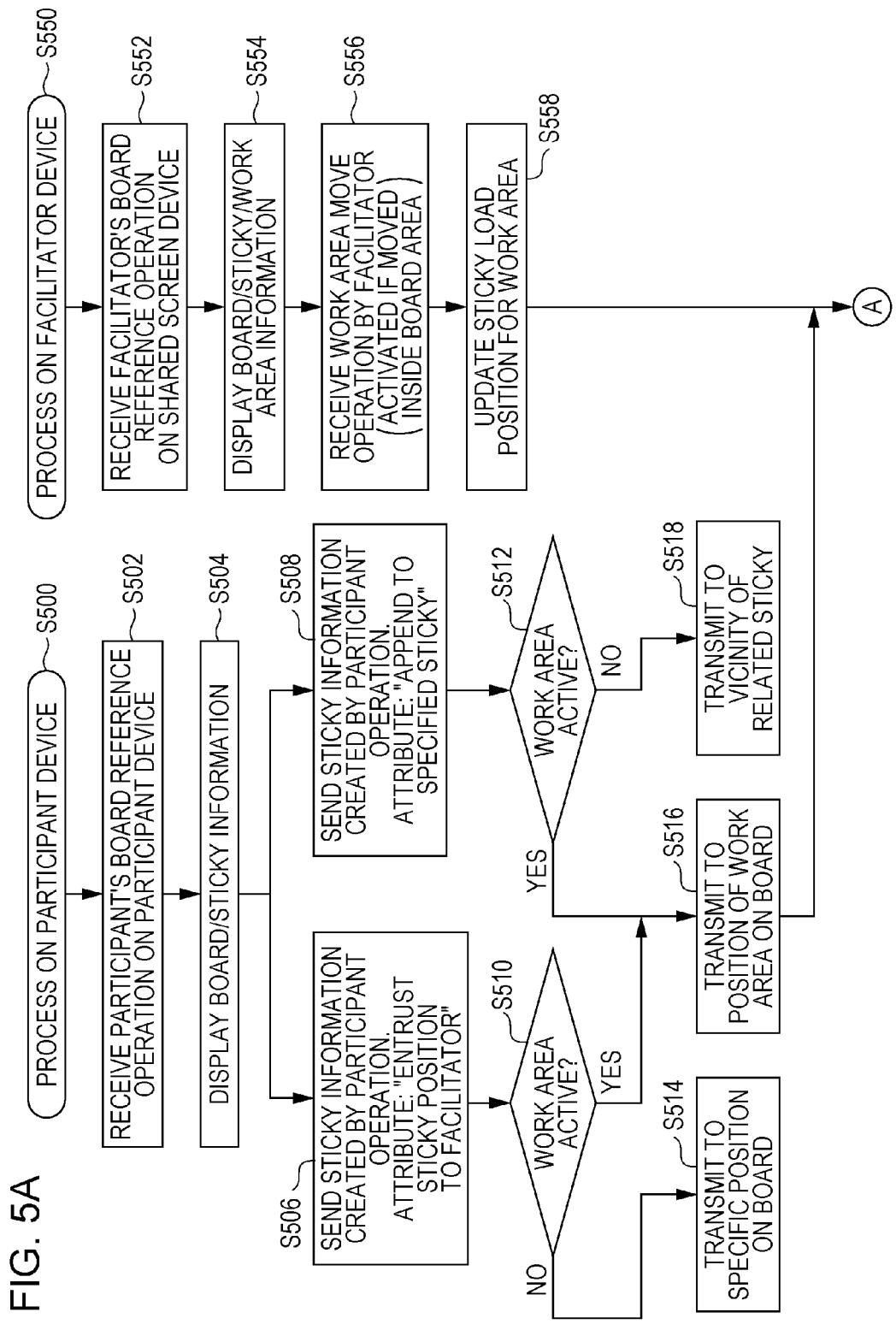
FIGS. 5A and 5B are a flowchart illustrating an exemplary process according to the exemplary embodiment.
Figure 5B:
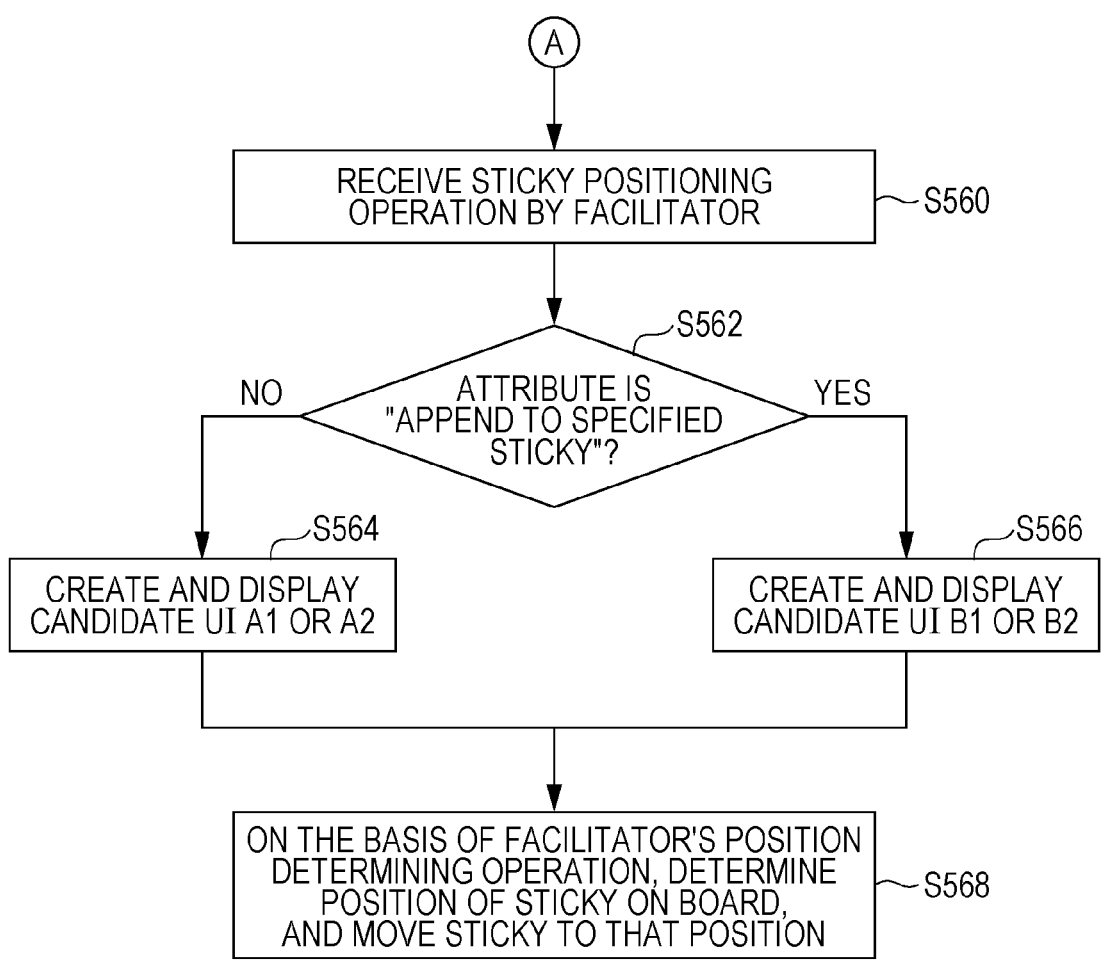

FIGS. 5A and 5B are a flowchart illustrating an exemplary process according to the exemplary embodiment.

The processing from step S500 to step S518 indicates processing primarily on the participant device 111.

In step S502, a board reference operation by the participant 311 on the participant device 111 is received. A board reference on the participant device 111 refers to displaying the same information as that being displayed on the screen of the shared screen device 121 onto a screen of the participant device 111.

In step S504, board/sticky information is displayed. An image (that being displayed on the screen of the shared screen device 121) is received from the board/sticky editing server 150 in response to the board reference operation, and is displayed on the screen of the participant device 111. In addition, the board and sticky information are alternately (or both) displayed, and sticky information is created by an operation by the participant 311. For example, path data of a finger touching the screen of the participant device 111 is treated as sticky information.

The sticky information created by an operation of the participant 311 is given either "entrust sticky position to facilitator" or "append to specified sticky" as an attribute according to a specifying operation of the participant 311. The process proceeds to step S506 in the case in which "entrust sticky position to facilitator" is given, and proceeds to step S508 in the case in which "append to specified sticky" is given.

In step S506, the created sticky information is sent by an operation of the participant 311. "Entrust sticky position to facilitator" is set as an attribute. This process is conducted in the case in which the participant 311 does not specify a position on the board for the sticky information.

In step S508, the created sticky information is sent by an operation of the participant 311. "Append to specified sticky" is set as an attribute. This process is conducted in the case in which the participant 311 specifies a position on the board for the sticky information. For example, sticky information that was already pasted onto the board when the board was referenced is specified as the "specified sticky".

In step S510, it is determined whether or not a work area is active. If active, the process proceeds to step S516, otherwise the process proceeds to step S514.

In step S512, it is determined whether or not a work area is active. If active, the process proceeds to step S516, otherwise the process proceeds to step S518.

Figure 6:
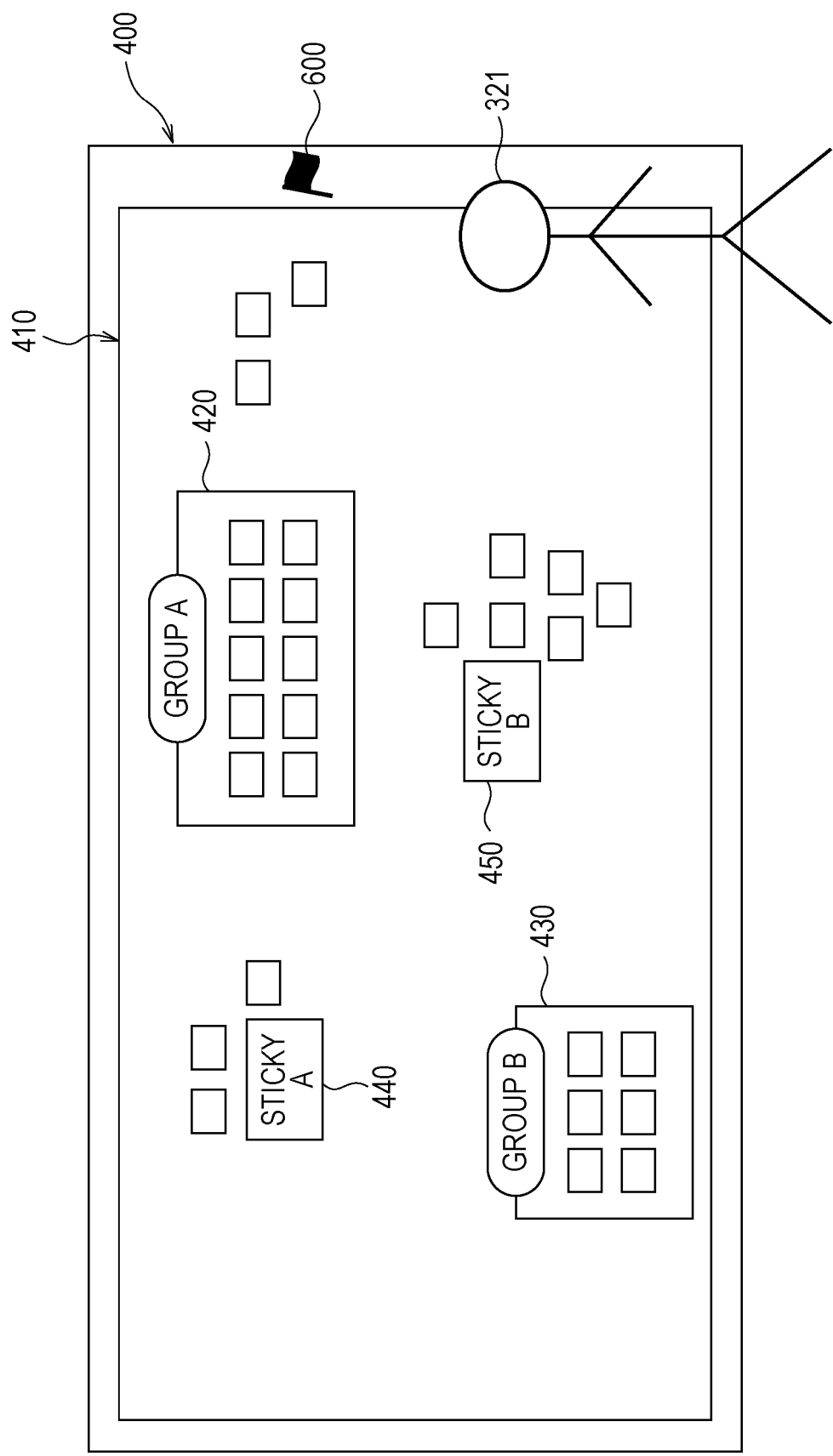
FIG. 6 is an explanatory diagram illustrating an exemplary display of a work area specifying icon according to the exemplary embodiment.

A work area not being active (inactive) refers to the case in which the work area specifying icon 600 is outside the board area 410, as illustrated by the example in FIG. 6. The work area specifying icon 600 is movable over the shared screen 400 by an operation of the facilitator 321. FIG. 6 is an explanatory diagram illustrating an exemplary display of a work area specifying icon 600 according to the exemplary embodiment. Although the display layout is similar to the shared screen 400 discussed earlier, in the present exemplary embodiment, the free area 480 is not displayed. However, an operation by the facilitator 321 may select either to display the free area 480 or use a work area, both the free area 480 may be displayed and a work area used, or alternatively, the free area 480 may be displayed in the case in which the work area specifying icon 600 is outside the board area 410, while the free area 480 is removed in the case in which the work area specifying icon 600 is inside the board area 410. Note that in the case of removing the free area 480, sticky information inside the free area 480 is moved to and displayed inside a work area 710 discussed later.

Figure 7:
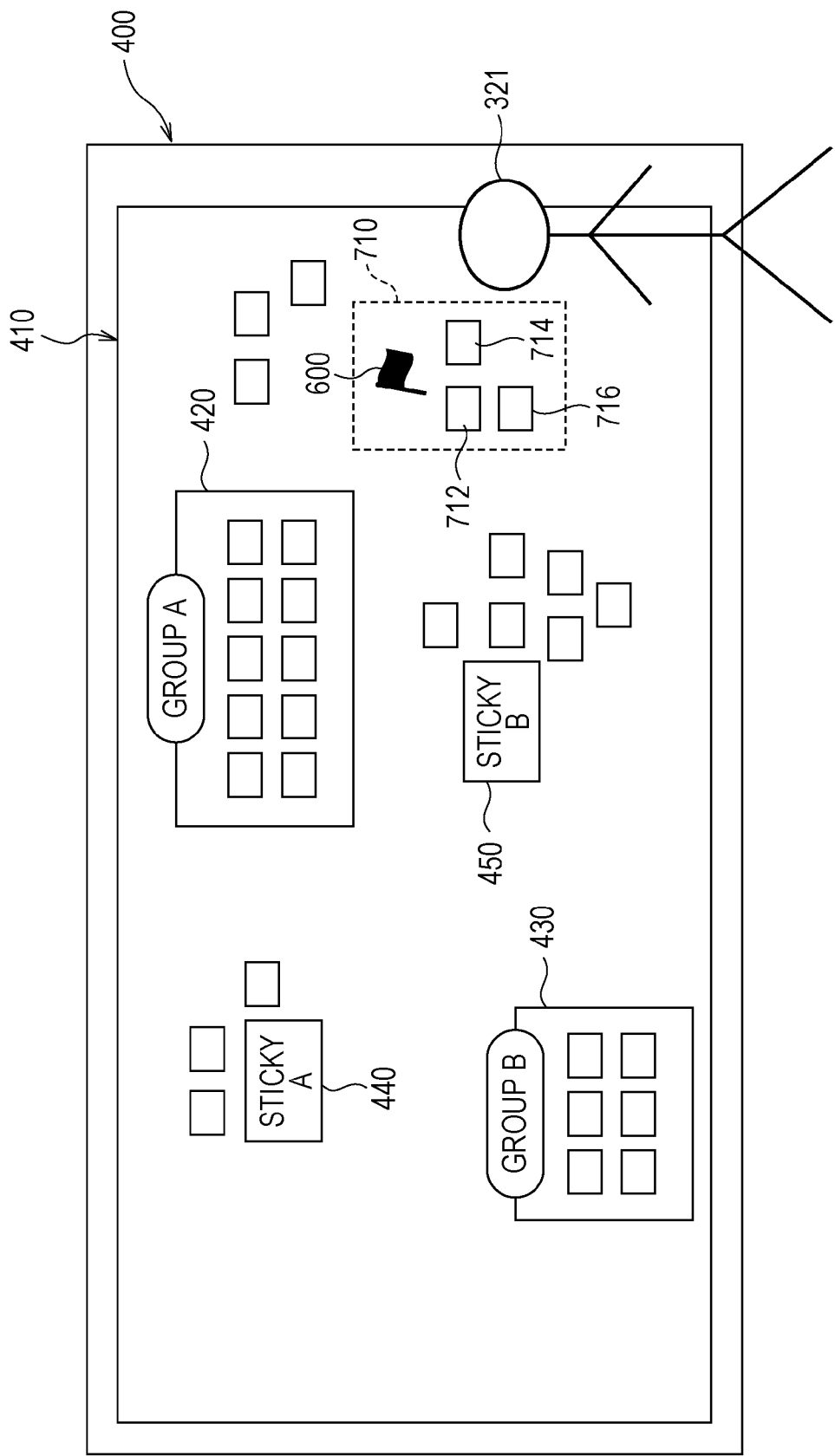
FIG. 7 is an explanatory diagram illustrating an exemplary display in the case of activating a work area in the exemplary embodiment.

A work area being active refers to the case in which the work area specifying icon 600 has been moved inside the board area 410, as illustrated by the example in FIG. 7. The repositioning operation screen creation module 162, in the case of sensing that the work area specifying icon 600 has been moved inside the board area 410, creates a work area 710 near the work area specifying icon 600. Herein, near the work area specifying icon 600 may be a work area 710 of predetermined size so as to include the work area specifying icon 600, as illustrated by the example in FIG. 7, or a work area 710 may be displayed to the right, to the left, below, or above the work area specifying icon 600. For example, in the case in which the handedness of the facilitator 321 is preset, a work area 710 may be displayed to the right of the work area specifying icon 600 in the right-handed case, whereas a work area 710 may be displayed to the left of the work area specifying icon 600 in the left-handed case.

In step S514, sticky information is transmitted to a specific position on the board. For example, sticky information is displayed in the free area 480 illustrated by the example in FIG. 4 or the like.

In step S516, sticky information is transmitted to the position of the work area 710 on the board. Inside the work area 710, the sticky information transmitted from the participant device 111 is displayed. In the example of FIG. 7, three sets of sticky information, namely the new stickies 712, 714, and 716 transmitted from the participant device 111 or the like, are displayed.

In step S518, sticky information is transmitted to the vicinity of a related sticky. As discussed earlier using the example of FIG. 4, the transmitted sticky information is displayed near the specified sticky information (the new sticky 441 in the example of FIG. 4).

The processing from step S552 to step S558 indicates processing primarily on the shared screen device 121.

In step S552, a board reference operation by the facilitator 321 on the shared screen device 121 is received. A board reference on the shared screen device 121 refers to displaying a board specified by an operation of the facilitator 321 (for example, an initial board without any sticky information pasted, or a board with previously pasted sticky information) on the screen of the shared screen device 121.

In step S554, board/sticky/work area information is displayed. A display like that illustrated by the example in FIG. 6 discussed earlier is presented.

In step S556, a work area move operation by the facilitator is received. For example, if the work area specifying icon 600 is moved inside the board area, a work area is activated. A display like that illustrated by the example in FIG. 7 discussed earlier is presented.

In step S558, the sticky load position for the work area is updated. The sticky information transmitted in step S516 is displayed inside the work area 710. The facilitator 321 understands that new sticky information has been added inside the work area 710. The work area 710 has a smaller surface area than the board area 410 and is close to the work area specifying icon 600 that the facilitator him- or herself moved, making it easy for the facilitator to notice that new sticky information has been added. Also, the new sticky information may be displayed using different colors or with a flash display (a display that blinks for a predetermined period) in order to help distinguish the newly added sticky information from other sticky information.

The processing from step S560 to step S568 indicates processing primarily on the board/sticky editing server 150.

Figure 8:
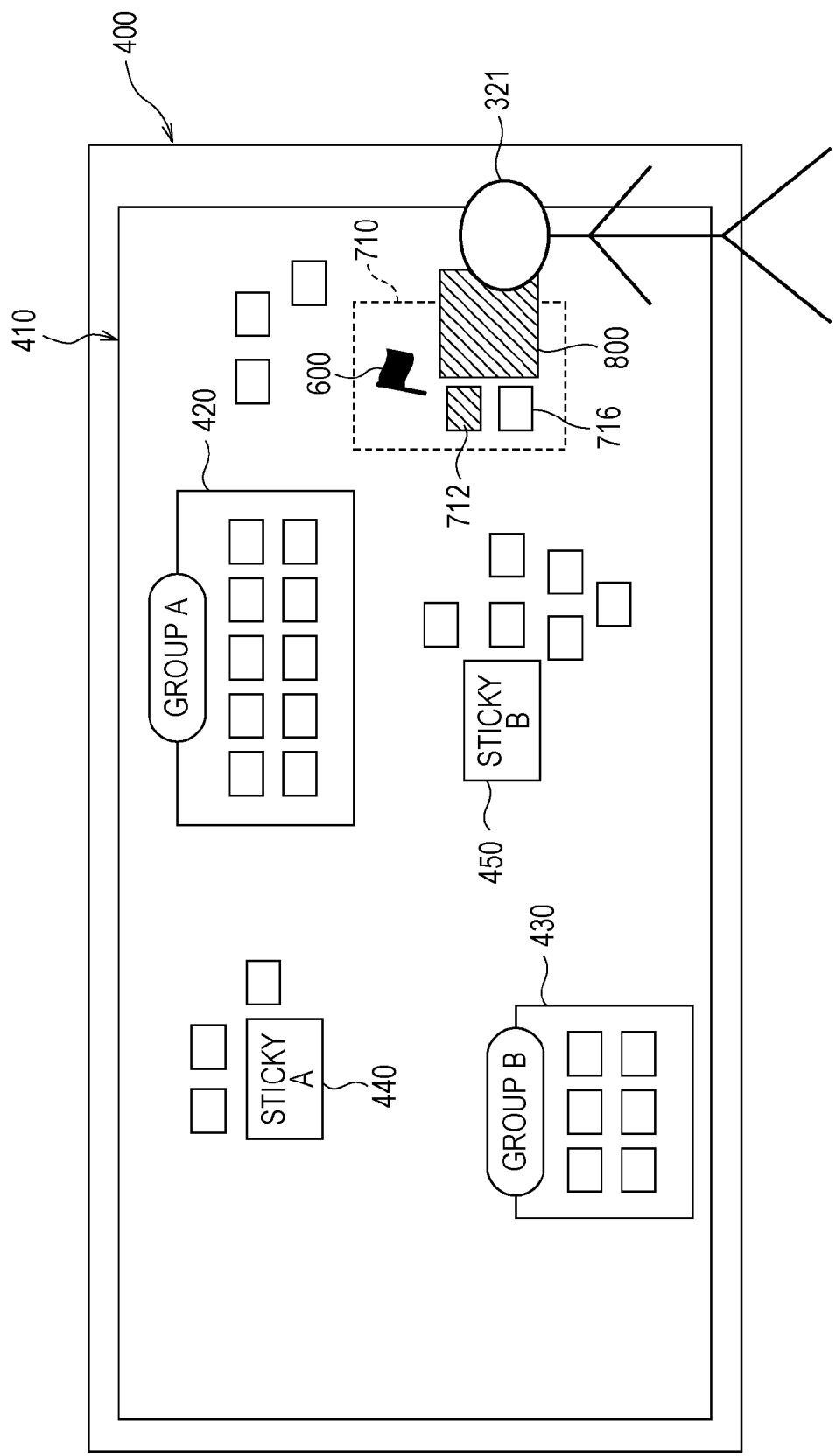
FIG. 8 is an explanatory diagram illustrating an exemplary display of a positioning UI area in the exemplary embodiment.

In step S560, a sticky positioning operation by the facilitator is received. For example, the sticky positioning operation corresponds to an operation that selects a new sticky 712 inside the work area 710. In the case of receiving a positioning operation, a positioning UI area 800 for positioning the selected new sticky 712 is displayed in the board area 410, as illustrated by the example of FIG. 8. Details of the positioning UI area 800 will be discussed later using FIGS. 9 to 12.

In step S562, it is determined whether or not the attribute is "append to specified sticky" (the processing in step S508 was conducted). The process proceeds to step S566 in the case where the attribute is "append to specified sticky", otherwise the process proceeds to step S564.

In step S564, a candidate display UI/A1 or a candidate display UI/A2 is created and displayed. The candidate display UI/A1 will be described using the example of FIG. 9, and the candidate display UI/A2 will be described using the example of FIG. 10.

Figure 9:
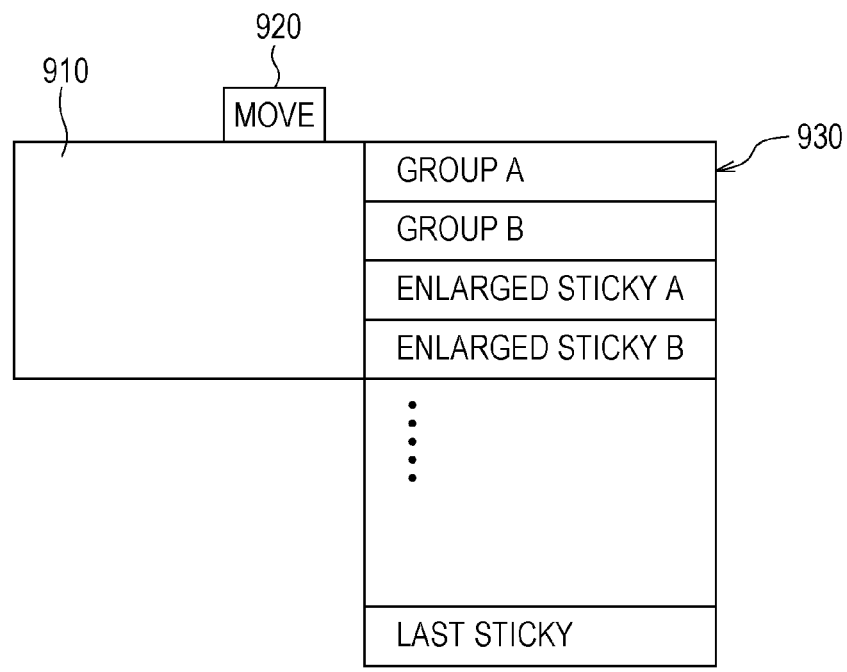
FIG. 9 is an explanatory diagram illustrating an exemplary display inside a work area in the exemplary embodiment.

FIG. 9 is an explanatory diagram illustrating an exemplary display (candidate display UI/A1) inside a work area in the exemplary embodiment. In the case of sensing that a sticky 910 to process (new sticky 712) has been selected, a destination candidate display button 920 is displayed. Then, a destination candidate list 930 is displayed in the case of sensing that the destination candidate display button 920 has been selected by an operation of the facilitator 321. As illustrated by the example of FIG. 9, the content of the destination candidate list 930 includes sticky information groups ("Group A", "Group B") grouped on the board area 410, sticky information whose number of likes from participants using the participant device 111 and the like is greater than a predetermined number ("Enlarged sticky A", "Enlarged sticky B"), and the sticky information ("Last sticky") transmitted by a first device (participant device 111) that transmitted the first sticky information (new sticky 712) being processed. One or more of these may be displayed. In the case in which a group (grouped sticky information group) is selected, the sticky 910 to process is included in that group. In the case in which an enlarged sticky (sticky information whose number of likes is greater than a predetermined number) is selected, the sticky 910 to process is positioned near that enlarged sticky. In the case in which the last sticky is selected, the sticky 910 to process is positioned near the last sticky. "Sticky information transmitted by a first device that transmitted the first sticky information being processed" refers to sticky information Y that was transmitted from the participant device that transmitted the sticky information X selected for positioning, before the sticky information X (immediately before, for example). This is because consecutively created sticky information is often related. Note that the above is extracted by having the board feature extraction module 164 use the board information table 1500 or by the sticky context data extraction module 166 use the sticky information table 1400.

Figure 10:
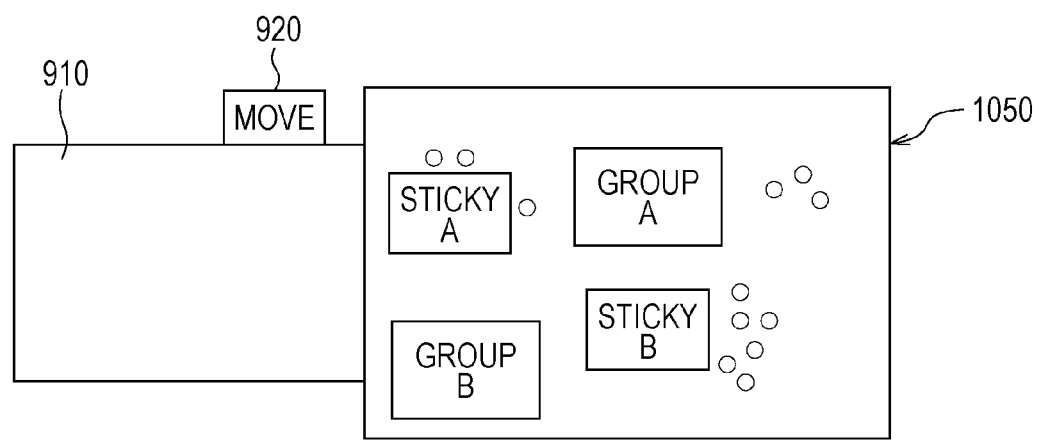
FIG. 10 is an explanatory diagram illustrating an exemplary display inside a work area in the exemplary embodiment.

FIG. 10 is an explanatory diagram illustrating an exemplary display (candidate display UI/A2) inside a work area in the exemplary embodiment. In the case of sensing that a target sticky 910 (new sticky 712) has been selected, a destination candidate display button 920 is displayed. Then, a digest map 1050 is displayed in the case of sensing that the destination candidate display button 920 has been selected by an operation of the facilitator 321. The content of the digest map 1050 is a reduced image of the board area 410, as illustrated by the example of FIG. 10. Inside the digest map 1050, a placement position for the sticky 910 to process is selected by an operation of the facilitator 321, and the sticky 910 to process is moved to that placement position. Note that the repositioning operation screen creation module 162 creates the reduced image.

In step S566, a candidate display UI/B1 or a candidate display UI/B2 is created and displayed. The candidate display UI/B1 will be described using the example of FIG. 11, and the candidate display UI/B2 will be described using the example of FIG. 12.

Figure 11:
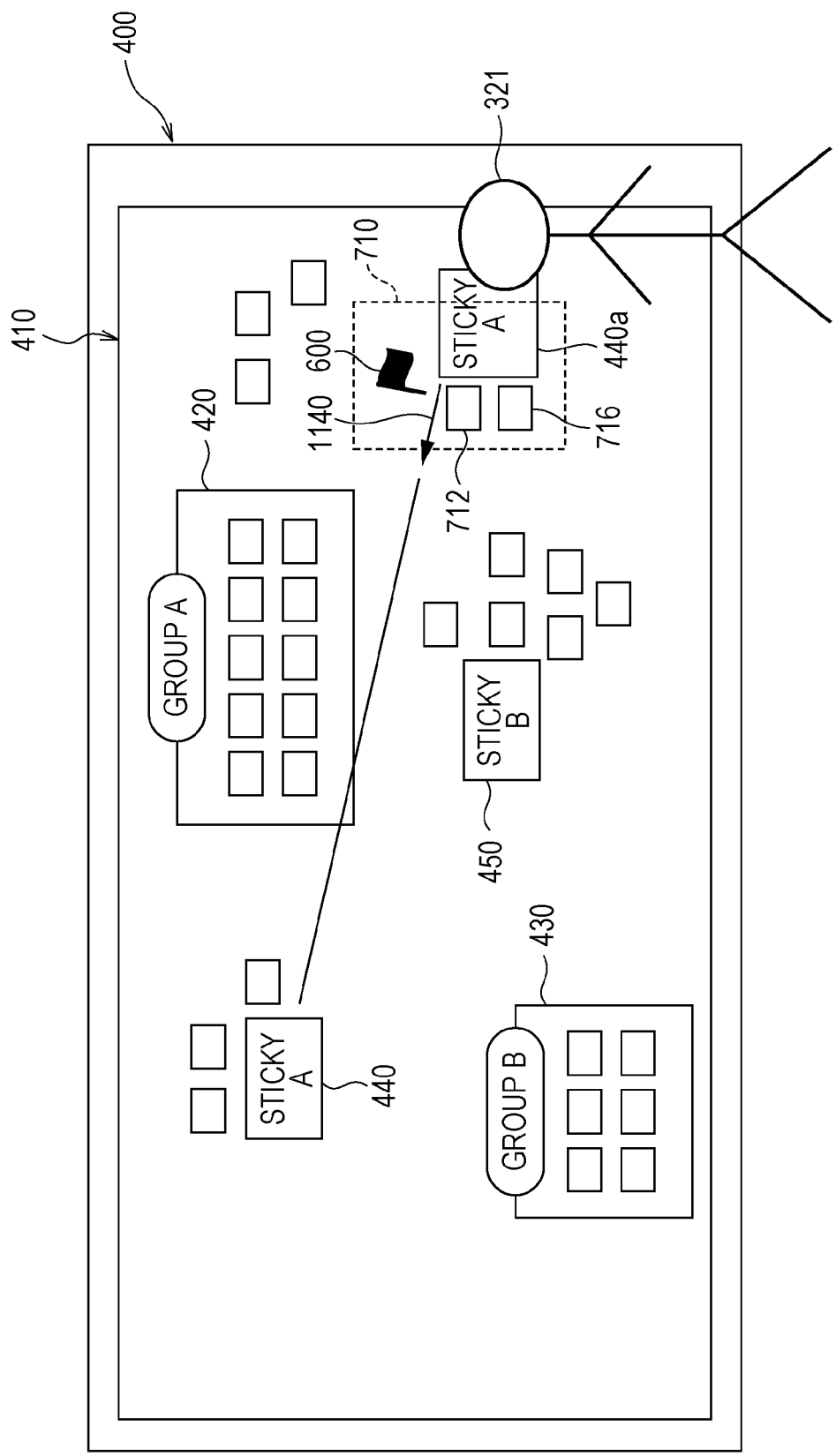
FIG. 11 is an explanatory diagram illustrating an exemplary display inside a work area in the exemplary embodiment.

FIG. 11 is an explanatory diagram illustrating an exemplary display (candidate display UI/B1) inside a work area in the exemplary embodiment. In the case of sensing that a new sticky 712 has been selected, a digest 440*a* of the enlarged sticky A is displayed. The digest 440*a* of the enlarged sticky A is a copy of the enlarged sticky A 440 specified by the participant who created the new sticky 712. Then, an position indicator line 1140 that indicates the position of the enlarged sticky A 440 from the position of the digest 440*a* of the enlarged sticky A is displayed. The facilitator 321 determines whether or not a position near the enlarged sticky A 440 specified by the participant who created the new sticky 712 is appropriate as the placement position for the new sticky 712. In the case of sensing an OK operation when the facilitator determines that the position is appropriate (for example, an operation such as double-tapping the digest 440*a* of the enlarged sticky A), the new sticky 712 is positioned near the enlarged sticky A 440.

Figure 12:
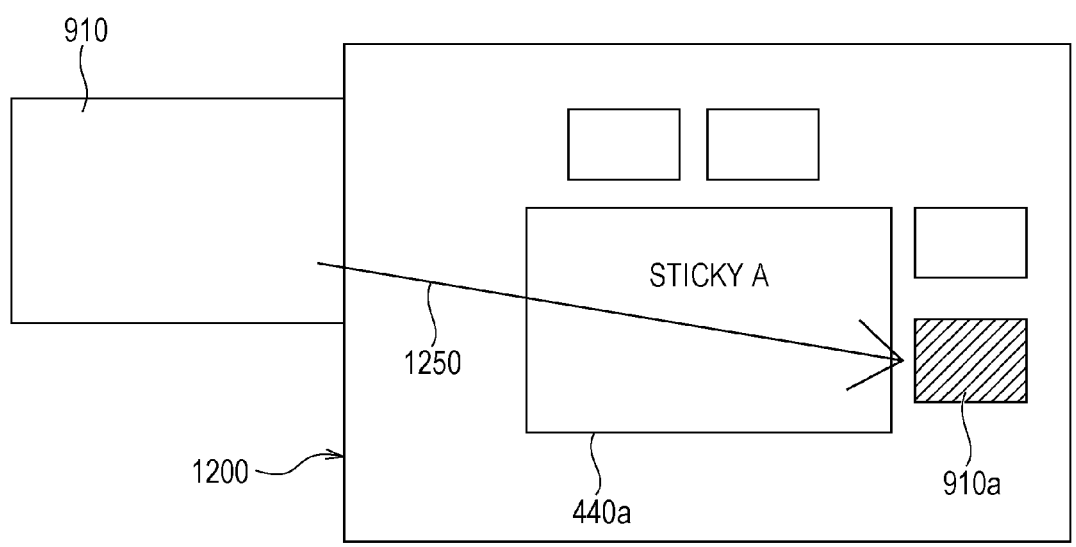
FIG. 12 is an explanatory diagram illustrating an exemplary display inside a work area in the exemplary embodiment.

FIG. 12 is an explanatory diagram illustrating an exemplary display (candidate display UI/B2) inside a work area in the exemplary embodiment. In the case of sensing that a target sticky 910 (new sticky 712) has been selected, a clip map 1200 is displayed. As illustrated by the example of FIG. 12, the content of the clip map 1200 is a copy of the surrounding area of the enlarged sticky A 440 specified by the participant who created the sticky 910 to process (a surrounding area including the enlarged sticky A 440). The digest 440*a* of the enlarged sticky A is a copy of the enlarged sticky A 440. The clip map 1200 is centered on the digest 440*a* of the enlarged sticky A 440 specified by a participant, for example, at a size having a surrounding margin in which the sticky 910 to process may be positioned. In addition, a sticky or the like of the digest 440*a* of the enlarged sticky A 440 displayed inside the clip map 1200 may be the same size as that displayed inside the board area 410, or a reduced version. However, the positional relationships among the sets of sticky information inside the board area 410 are kept. The facilitator 321 determines whether or not a position near the enlarged sticky A 440 specified by the participant who created the sticky 910 to process is appropriate as the placement position for the sticky 910 to process. In the case of sensing an operation selecting a placement position inside the clip map 1200 when the facilitator determines that the position is appropriate (an operation selecting the position of the participant-specified position 910*a*), the sticky 910 to process is positioned near the enlarged sticky A 440. In addition, the sticky information 910 to process may also display a graphic (the arrow 1250, for example) indicating movement to the position of the participant-specified position 910*a*.

Figure 13:
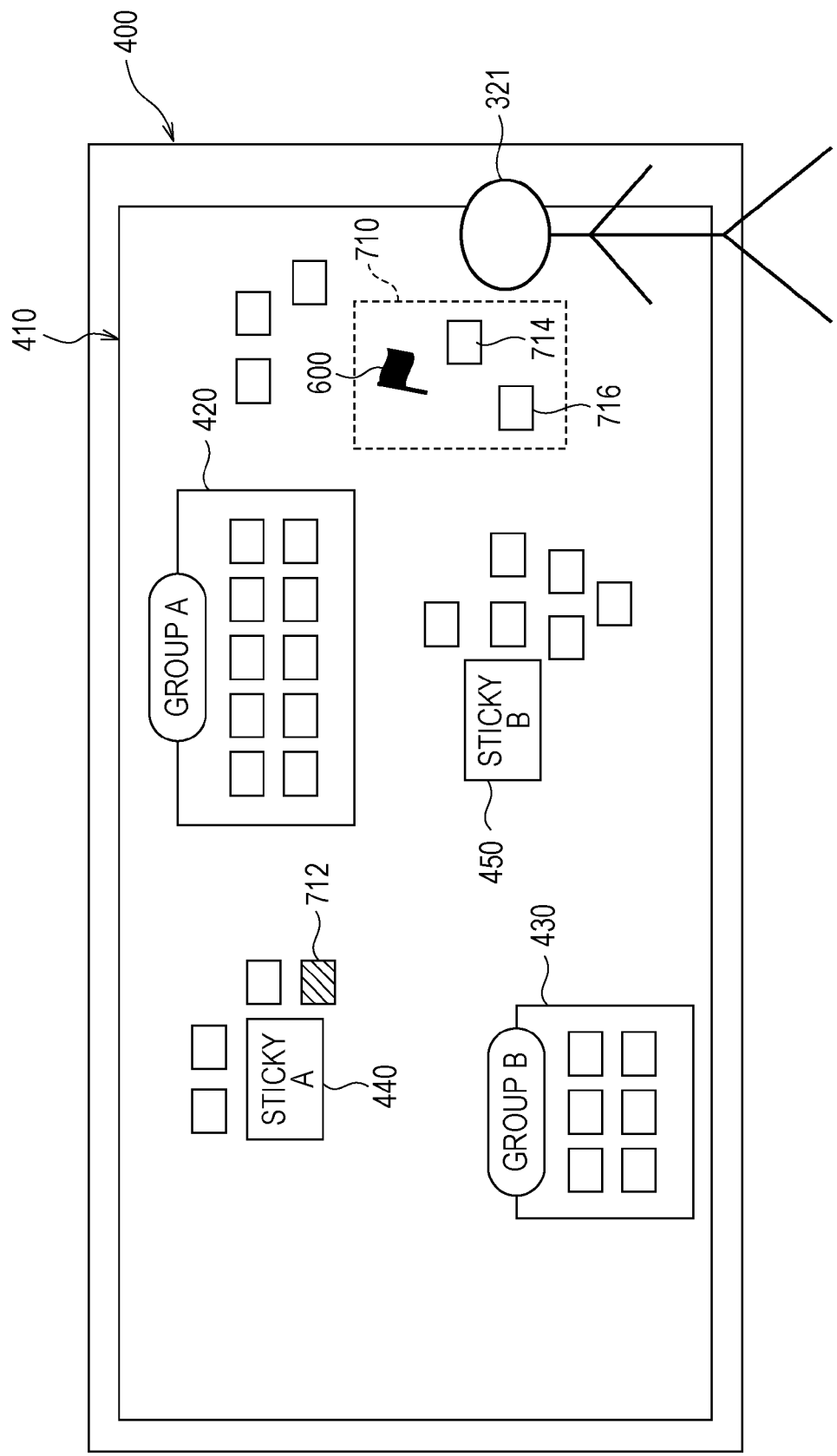
FIG. 13 is an explanatory diagram illustrating an exemplary display in the case of positioning a new sticky in the exemplary embodiment.

In step S568, on the basis of a facilitator's position determining operation, the position of a sticky on the board is determined, and the sticky is moved to that position. FIG. 13 is an explanatory diagram illustrating an exemplary display in the case of positioning a new sticky 712 in the exemplary embodiment. The example of FIG. 13 illustrates a state in which, from the state illustrated by the example of FIG. 8, the new sticky 712 that was being displayed inside the work area 710 is positioned near the enlarged sticky A 440 according to instructions from the facilitator 321 by one of the specifying methods illustrated by the examples of FIGS. 9 to 12 (the new sticky 712 is removed from the work area 710, and the new sticky 712 is displayed near the enlarged sticky A 440).

Note that a hardware configuration of a computer executing a program that acts as the present exemplary embodiment (such as the participant device 111, the shared screen device 121, and the board/sticky editing server 150) is a general computer as illustrated by the example of FIG. 16, and specifically is a computer or the like that may be a personal computer or a server. In other words, as a specific example, a CPU 1601 is used as a processing unit (computational unit), while RAM 1602, ROM 1603, and an HD 1604 are used as storage devices. For the HD 1604, a hard disk may be used, for example. The computer is made up of the CPU 1601 that executes programs such as the communication module 152, the communication device information specifying module 154, the board/sticky management module 156, the repositioning operation screen creation module 162, the board feature extraction module 164, and the sticky context data extraction module 166, the RAM 1602 that stores such programs and data, the ROM 1603 that stores programs and the like for activating the computer, the HD 1604 which is an auxiliary storage device, a receiving device 1606 that receives data on the basis of user operations with respect to a keyboard, mouse, touch panel, or the like, an image output device 1605 such as a CRT or liquid crystal display, a communication link interface 1607 such as a network interface card for connecting to a communication network, and a bus 1608 for joining and exchanging data with the above components. Multiple such computers may also be connected to each other by a network.

Of the foregoing exemplary embodiments, for those made up of a computer program, software in the form of a computer program is made to be read into a system with the above hardware configuration, and the foregoing exemplary embodiments are realized by the cooperative action of the software and hardware resources.

Note that the hardware configuration illustrated in FIG. 16 illustrates a single exemplary configuration, and that the exemplary embodiment is not limited to the configuration illustrated in FIG. 16 insofar as the configuration still enables execution of the modules described in the exemplary embodiment. For example, some modules may also be realized with special-purpose hardware (such as an ASIC, for example), and some modules may be configured to reside within an external system and be connected via a communication link. Furthermore, it may also be configured such that multiple instances of the system illustrated in FIG. 16 are connected to each other by a communication link and operate in conjunction with each other. Additionally, besides a personal computer in particular, an exemplary embodiment may also be incorporated into a device such as an information appliance, photocopier, fax machine, scanner, printer, or multi-function device (i.e., an image processing device having two or more from among scanning, printing, copying, and faxing functions).

Note that the described program may be provided stored in a recording medium, but the program may also be provided via a communication medium. In this case, a computer-readable recording medium storing a program, for example, may also be taken to be an exemplary embodiment of the present invention with respect to the described program.

A "computer-readable recording medium storing a program" refers to a computer-readable recording medium upon which a program is recorded, and which is used in order to install, execute, and distribute the program, for example.

Potential examples of a recording medium include a Digital Versatile Disc (DVD), encompassing formats such as DVD-R, DVD-RW, and DVD-RAM defined by the DVD Forum and formats such as DVD+R and DVD+RW defined by DVD+RW Alliance, a compact disc (CD), encompassing formats such as read-only memory (CD-ROM), CD Recordable (CD-R), and CD Rewritable (CD-RW), a Blu-ray Disc (registered trademark), a magneto-optical (MO) disc, a flexible disk (FD), magnetic tape, a hard disk, read-only memory (ROM), electrically erasable and programmable read-only memory (EEPROM (registered trademark)), flash memory, random access memory (RAM), and a Secure Digital (SD) memory card.

In addition, all or part of the above program may also be recorded to the recording medium and saved or distributed, for example. Also, all or part of the above program may be communicated by being transmitted using a transmission medium such as a wired or wireless communication network used in a local area network (LAN), a metropolitan area network (MAN), a wide area network (WAN), an internet, an intranet, an extranet, or some combination thereof, or alternatively, by being impressed onto a carrier wave and propagated.

Furthermore, the above program may be part of another program, and may also be recorded to a recording medium together with other separate programs. The above program may also be recorded in a split manner across multiple recording media. The above program may also be recorded in a compressed, encrypted, or any other recoverable form.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising at least one central processing unit (CPU) configured to:
   receive first sticky information from a first device;
   receive, from a second device that receives an operation for conducting a process of pasting sticky information onto a board, an operation for activating a work area, the work area being a portion of the board in which to conduct work for pasting the first sticky information; and
   in the case in which an operation activating a work area is received, create display information for displaying an image indicating that the first sticky information is pasted into the work area,
   wherein the at least one CPU, in the case in which an operation activating a work area is not received, and the first sticky information is not related to second sticky information already pasted onto the board, creates display information for displaying an image indicating that the first sticky information has been pasted in a predetermined area on the board,
   wherein the work area is inactivated by moving a specifying icon outside an area of the board.

2. The information processing device according to claim 1, wherein
   the at least one CPU, in the case in which the operation activating the work area is received, creates display information for displaying an image indicating, in the work area, board feature information or a relationship between the first sticky information and second sticky information already pasted onto the board.

3. The information processing device according to claim 2, wherein
   the at least one CPU creates display information enabling an operator using the second device to select, and display in the work area, one or more from among sticky information groups that are grouped on the board, sticky information whose number of likes from participants using the first device is greater than a threshold number, and sticky information transmitted by a first device that transmitted the first sticky information being processed.

4. The information processing device according to claim 2, wherein
   the at least one CPU creates a reduced image of the board, and creates display information enabling an operator using the second device to specify a placement position for the first sticky information within the reduced image, and display the first sticky information in the work area.

5. The information processing device according to claim 2, wherein
   the at least one CPU receives, from the first device, first sticky information and second sticky information related to the first sticky information, and
   the at least one CPU displays the received second sticky information within the work area, and creates display information enabling drawing of a graphic indicating a positional relationship with the second sticky information on the board.

6. The information processing device according to claim 2, wherein
   the at least one CPU receives, from the first device, first sticky information and second sticky information related to the first sticky information, and
   the at least one CPU creates an image of the received second sticky information and sticky information around the second sticky information on the board, and creates display information enabling an operator using the second device to specify a placement position for the first sticky information within the created image, and display the first sticky information in the work area.

7. The information processing device according to claim 1, wherein
the at least one CPU, in the case in which an operation activating a work area is not received, and the first sticky information is related to second sticky information already pasted onto the board, creates display information for displaying an image indicating that the first sticky information has been pasted near the second sticky information.

8. The information processing device according to claim 1, wherein the at least one CPU indicates the activated work area within the board by displaying a work area icon in or adjacent to the activated work area.

9. An information processing method comprising:
receiving at least first sticky information from a first device;
receiving, from a second device that receives an operation for conducting a process of pasting sticky information onto a board, an operation for activating a work area, the work area being a portion of the board in which to conduct work for pasting the first sticky information; and
in the case of receiving an operation activating a work area, creating display information for displaying an image indicating that the first sticky information is pasted into the work area,
wherein the at least one CPU, in the case in which an operation activating a work area is not received, and the first sticky information is not related to second sticky information already pasted onto the board, creates display information for displaying an image indicating that the first sticky information has been pasted in a predetermined area on the board,
wherein the work area is inactivated by moving a specifying icon outside an area of the board.

10. A non-transitory computer readable medium storing a program causing a computer to execute a process for processing information, the process comprising:
receiving at least first sticky information from a first device;
receiving, from a second device that receives an operation for conducting a process of pasting sticky information onto a board, an operation for activating a work area, the work area being a portion of the board in which to conduct work for pasting the first sticky information; and
in the case of receiving an operation activating a work area, creating display information for displaying an image indicating that the first sticky information is pasted into the work area,
wherein the at least one CPU, in the case in which an operation activating a work area is not received, and the first sticky information is not related to second sticky information already pasted onto the board, creates display information for displaying an image indicating that the first sticky information has been pasted in a predetermined area on the board,
wherein the work area is inactivated by moving a specifying icon outside an area of the board.

* * * * *